(12) United States Patent
Medina

(10) Patent No.: US 7,500,770 B2
(45) Date of Patent: Mar. 10, 2009

(54) MOTORCYCLE TAIL LIGHT ASSEMBLY

(75) Inventor: Michael R. Medina, Brookfield, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 11/749,546

(22) Filed: May 16, 2007

(65) Prior Publication Data

US 2008/0285292 A1    Nov. 20, 2008

(51) Int. Cl.
*F21V 33/00* (2006.01)

(52) U.S. Cl. ........................ 362/473; 362/476; 362/545; 340/468; 340/469; 340/479

(58) Field of Classification Search ................ 362/473, 362/475, 476, 540–545; 340/463, 464, 467, 340/468, 469, 478, 479
See application file for complete search history.

(56) References Cited

U.S. PATENT DOCUMENTS

| | | | |
|---|---|---|---|
| 3,500,315 A | 3/1970 | Shimada | |
| 5,598,068 A | 1/1997 | Shirai | |
| 5,808,592 A | 9/1998 | Mizutani et al. | |
| 6,250,788 B1 | 6/2001 | Muller | |
| 6,623,151 B2 | 9/2003 | Pederson | |
| 6,714,128 B2 * | 3/2004 | Abbe et al. | 340/468 |
| 7,038,593 B2 | 5/2006 | Pederson | |
| 7,064,354 B2 | 6/2006 | Chen | |
| 7,064,498 B2 | 6/2006 | Dowling et al. | |
| 7,114,738 B1 | 10/2006 | Chen | |
| 7,150,554 B2 * | 12/2006 | Calderas | 362/545 |
| 7,241,036 B2 * | 7/2007 | Miyagawa et al. | 362/473 |
| 2002/0171543 A1 | 11/2002 | Abbe et al. | |
| 2003/0161162 A1 | 8/2003 | Tracey | |
| 2003/0206418 A1 | 11/2003 | Strazzanti | |
| 2005/0063194 A1 | 3/2005 | Lys et al. | |

* cited by examiner

*Primary Examiner*—John A Ward
(74) *Attorney, Agent, or Firm*—Michael Best & Friedrich LLP

(57) ABSTRACT

A tail light assembly for a motorcycle includes a first array of at least one LED in illuminated in at least a first color. The first group of LEDs operates in a non-operating condition, a running condition where each LED of the first array is illuminated at first intensity, and a braking condition where each LED is illuminated at a second, brighter intensity. A second array of at least one LED is illuminated in at least a second color. The second array operates in a non-operating condition, and a flashing condition where each LED of the second array alternates between being illuminated and not illuminated. Each LED of the first array is illuminated at the first or the second intensity while each LED of the second array alternates between being illuminated and not illuminated in the flashing condition.

22 Claims, 5 Drawing Sheets

MOTORCYCLE TAIL LIGHT ASSEMBLY

BACKGROUND

The present invention relates to tail lights on a vehicle. More specifically, it relates to a tail light arrangement on a motorcycle.

In the past, a motorcycle tail light arrangement commonly included three separate lamps. Two orange or amber colored turn signal lamps were provided, such that one was positioned on the left and the other was positioned on the right of a motorcycle. A middle red-colored lamp was provided to be illuminated while the motorcycle was running and illuminated at a brighter intensity when the brake was applied. Another arrangement used only two lamps, one positioned on each side of the motorcycle. Bi-colored LEDs were used, such that when the brake was applied, the LEDs lit up red and when the turn signal was used, the LEDs on the appropriate side blinked amber or orange. Because the LEDs were bi-colored, only one color, and thus, function, could be illuminated at a given time.

SUMMARY

In one embodiment, the present invention provides a motorcycle comprising a frame, a brake actuator, a turn signal switch, and an ignition switch. The brake actuator generates a brake signal, the turn signal switch generates a turn signal, and the ignition switch generates an ignition signal. A tail light assembly is coupled to a rear portion of the motorcycle and includes a tail light housing. A first array of at least one light-emitting diode is coupled to the tail light housing. The first array is operable in a non-operating condition where each light-emitting diode of the first array is not illuminated, a running condition in response to the ignition signal where each light-emitting diode of the first array is illuminated at first intensity, and a braking condition in response to the brake signal where each light-emitting diode is illuminated at a second intensity greater than the first intensity. A second array of at least one light-emitting diode is coupled to the tail light housing. The second array is operable in a non-operating condition where each light-emitting diode of the second array is not illuminated and a flashing condition in response to the turn signal where each light-emitting diode of the second array alternates between being illuminated and not illuminated. Each light-emitting diode of the first array is illuminated at one of the first intensity or the second intensity while each light-emitting diode of the second array alternates between being illuminated and not illuminated in the flashing condition. The first array is illuminated in at least a first color, and the second array is illuminated in at least a second color.

In another embodiment, the present invention provides a method of illuminating a tail light assembly on a vehicle that includes illuminating a first array of at least one light-emitting diode at a first intensity in a running condition, alternating a second array of at least one light-emitting diode between being illuminated and not illuminated in a flashing condition, illuminating the first array of at least one light-emitting diode at a second intensity greater than the first intensity in a braking condition, and illuminating the first array of at least one light-emitting diode at one of the first intensity and the second intensity while the second array of at least one light-emitting diode alternates between being illuminated and not illuminated in the flashing condition.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
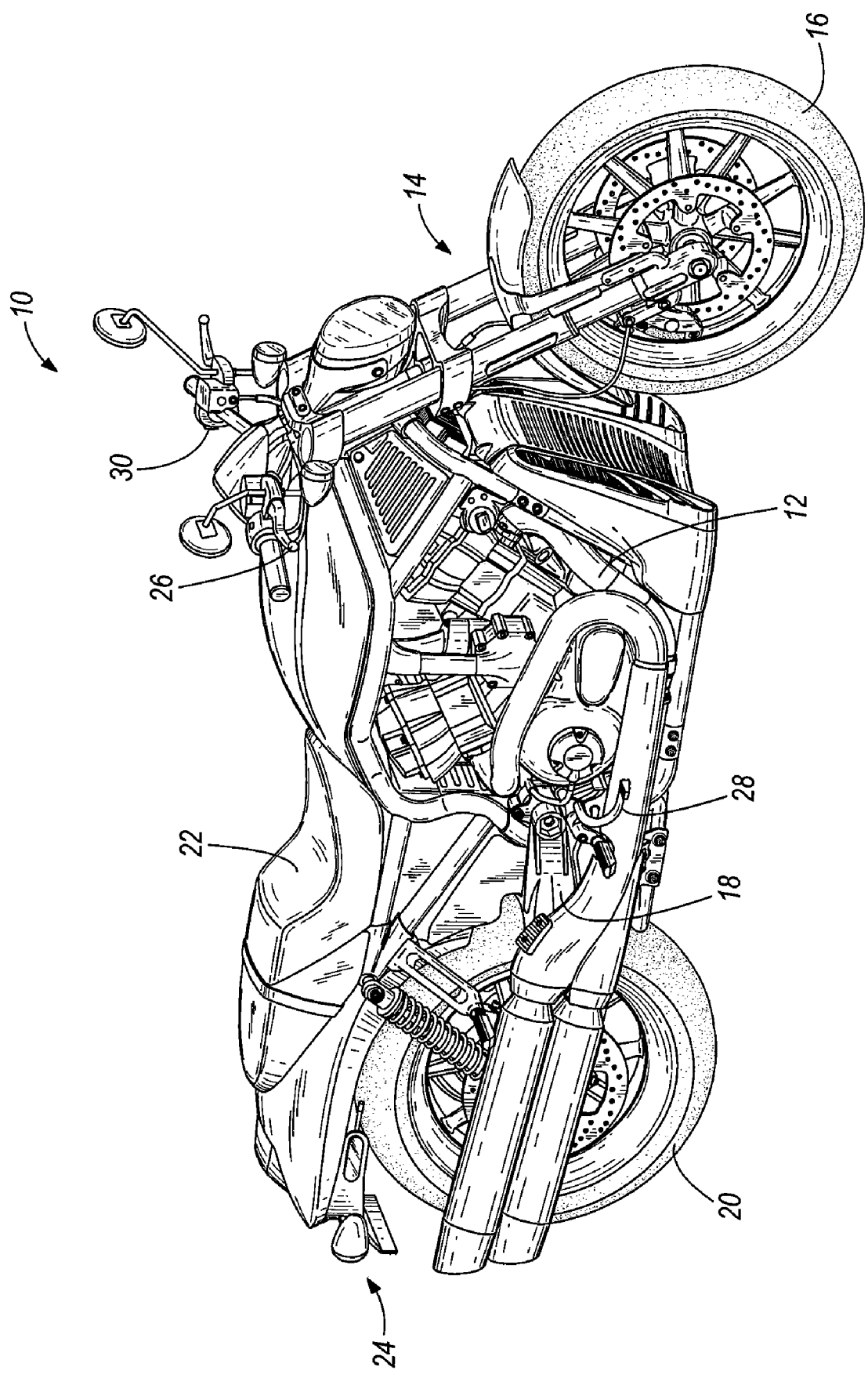
FIG. 1 is a perspective view of a motorcycle including a tail light assembly embodying the present invention.

FIG. 1 shows a motorcycle 10 including a frame 12, a steering assembly 14 pivotally coupled to a forward portion of the frame 12, and a front wheel 16 rotatably coupled to the steering assembly 14. A swingarm 18 is pivotally coupled to a rearward portion of the frame 12 and a rear wheel 20 is rotatably coupled to the swingarm 18. A seat 22 is positioned generally above the swingarm 18. A tail light assembly 24 is coupled to the rearward portion of the frame 12 above the rear wheel 20. The motorcycle 10 includes a hand brake lever 26 coupled to the steering assembly 14, a brake pedal 28 coupled to the frame 12, a turn signal switch 30 coupled to the steering assembly 14, and an ignition switch (not shown) coupled to the steering assembly 14. The brake lever 26 and brake pedal 28 generate brake signals when actuated, the turn signal switch 30 generates a turn signal when actuated, and the ignition switch generates an ignition signal when activated.

Figure 2:
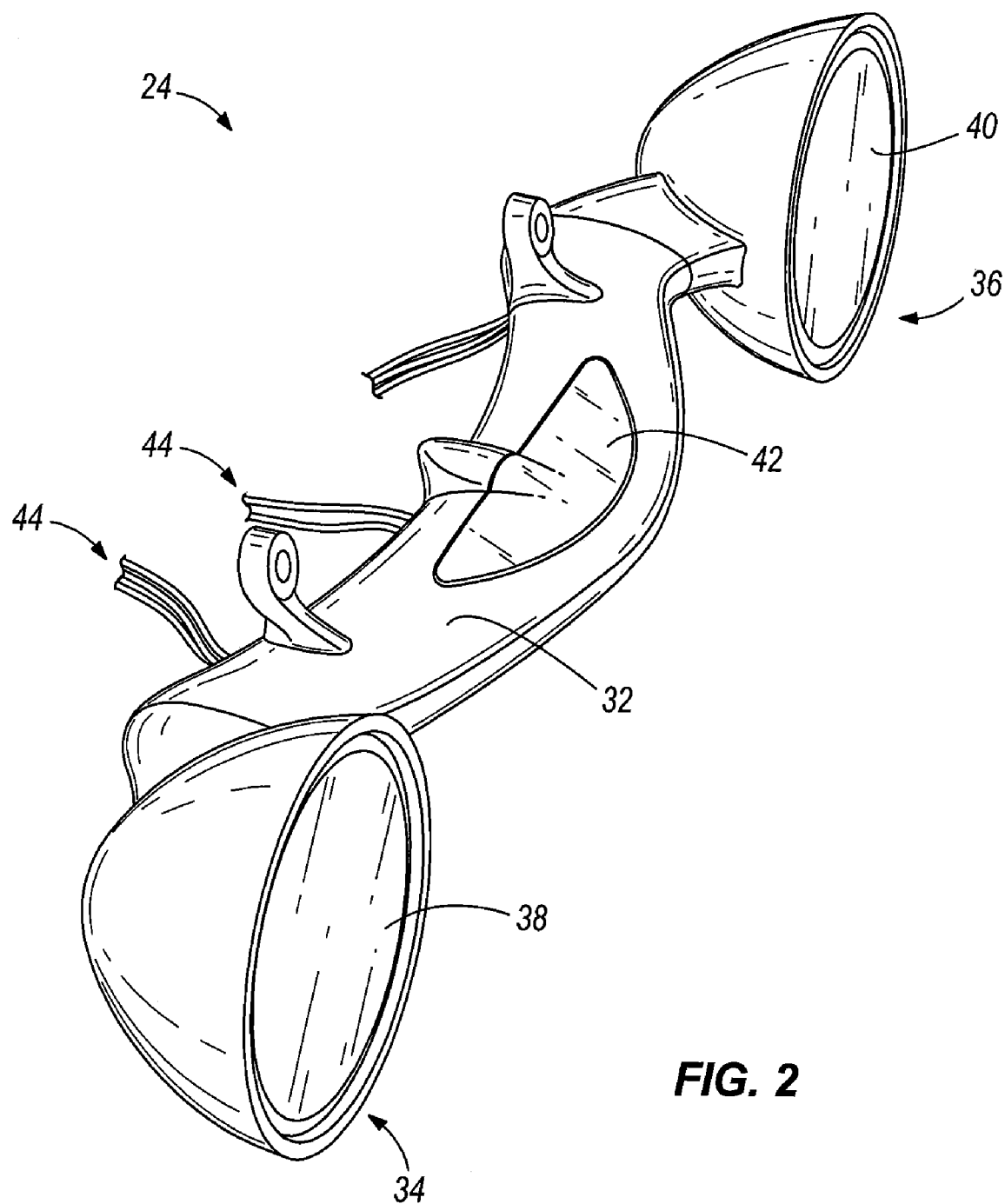
FIG. 2 is a perspective view of the tail light assembly of FIG. 1.

FIG. 2 shows one embodiment of a tail light assembly 24 including a crossbar 32, a first tail lamp 34 positioned on the left end of the crossbar 32, and a second tail lamp 36 positioned on the right end of the crossbar 32. The first tail lamp 34 has at least one lens 38 and the second tail lamp 36 has at least one lens 40. A license plate light 42 is positioned generally between the first and second tail lamps 34, 36 on the crossbar 32. Power cords 44 extend outward from the crossbar 32 to supply power from the motorcycle's electrical power supply. The motorcycle 10 includes a turn signal control module (not shown) that delivers power at the desired intensity and duration to the tail light assembly 24.

Figure 3:
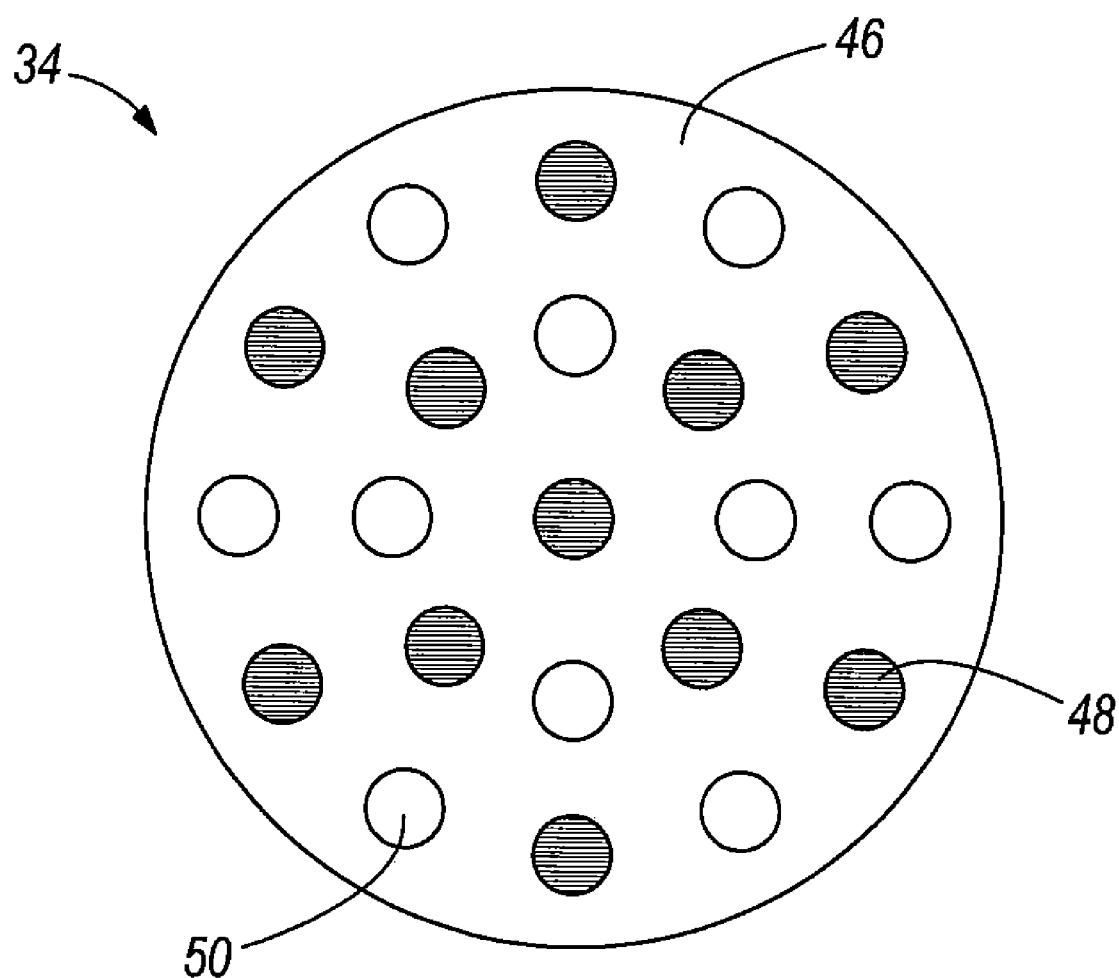
FIG. 3 is a front view of a tail lamp of the tail light assembly of FIG. 2, illustrating first and second arrays of LEDs.

The left and right tail lamps 34, 36 are substantially identical. Therefore, only the left tail lamp 34 is described with reference to FIG. 3. The tail lamp 34 has a circuit board 46 that is positioned behind the lens 38 (the lens has been removed for clarity). The lamp 34 has a first array 48 of light-emitting diodes (LEDs) that are mounted to the circuit board 46 in a first pattern. A second array 50 of LEDs is mounted to the circuit board 46 in a second pattern. The first array 48 and the second array 50 are intermixed on the board 46. The first array 48 includes red LEDs. The second array 50 includes amber LEDs. In other embodiments, the second array 50 can include white LEDs. The LEDs are electrically connected via the circuit board 46 to a rearward portion of the housing by electrical wires (not shown) that couple to the power cords 44. In one embodiment, the second array 50 glows white and the at least one lens 38 is amber. In another embodiment, the second array 50 glows amber and the at least one lens 38 is clear. In both embodiments, the resultant color of the second array 50 is amber upon illumination, and the resultant color of the first array 48 is red upon illumination.

Array is defined herein to include an arrangement or grouping of one or more LEDs of a single color. The first array 48 operates in a non-operating condition where each light-emitting diode is not illuminated, a running condition in response to the ignition signal where each light-emitting diode is illuminated at a first intensity, and a braking condition in response to the brake signal where each light-emitting diode is illuminated at a second intensity greater than the first intensity. The second array 50 operates in a non-operating condition where each light-emitting diode is not illuminated and a flashing condition in response to the turn signal where each light-emitting diode alternates between being illuminated and not illuminated.

Figure 4:
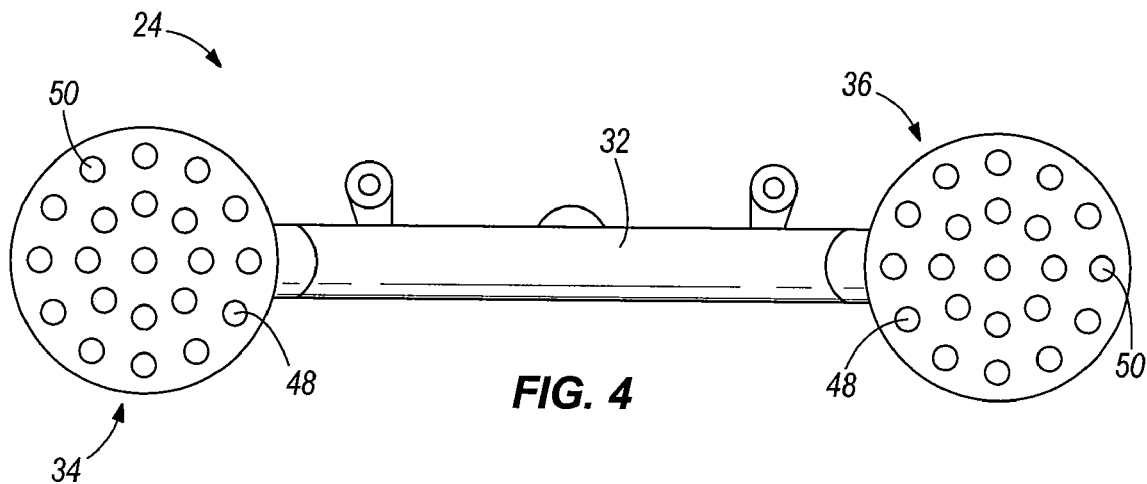
FIG. 4 is a front view of the tail light assembly of FIG. 2, illustrating the first and second arrays in non-illuminated conditions.
Figure 5:
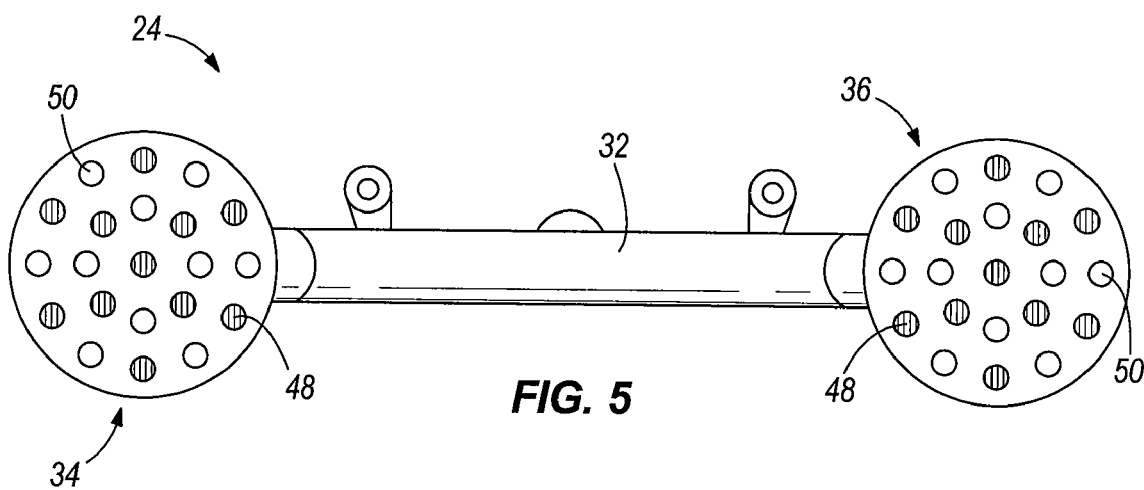
FIG. 5 is a view similar to FIG. 4, illustrating the first array in a running condition and the second array in the non-illuminated condition.

When the motorcycle 10 is turned off, the arrays 48, 50 of both lamps 34, 36 are not illuminated, as shown in FIG. 4. When the ignition switch is turned to on, a signal is sent to the first arrays 48 of both lamps 34, 36 to be illuminated at a first, low intensity, while the second arrays 50 of both lamps 34, 36 remain non-illuminated, as shown in FIG. 5. The license plate light 42 (FIG. 2) is also illuminated in response to activation of the ignition switch.

Figure 6:
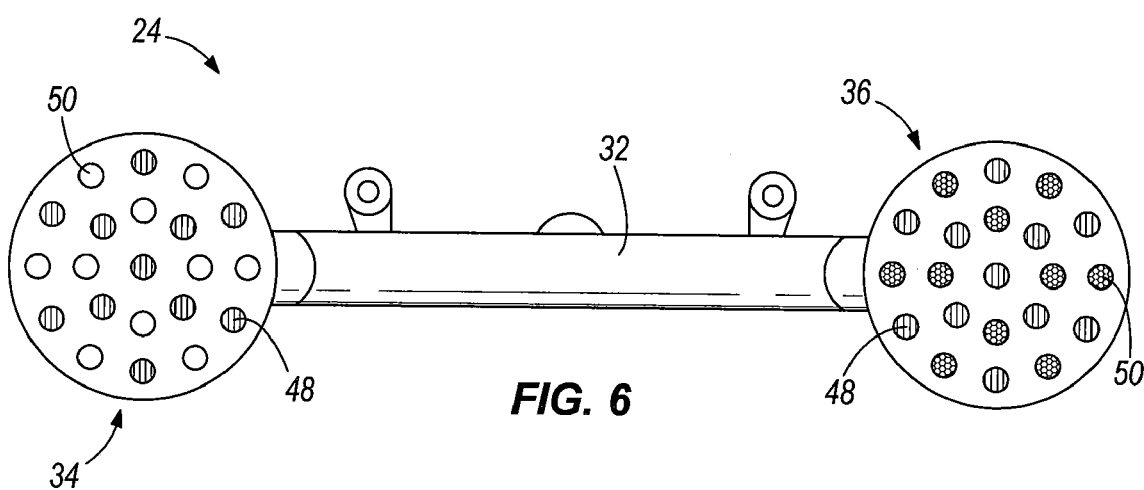
FIG. 6 is a view similar to FIG. 4, illustrating the first array in the running condition and the second array on a right tail lamp in the flashing condition.

When the right turn signal switch 30 is actuated, a signal is sent to the second array 50 of the right lamp 36 to alternate between being illuminated and not illuminated. The first arrays 48 of both lamps 34, 36 remain on at the running intensity while the second array 50 of the right lamp 36 flashes on and off. The right lamp 36 alternates between the condition shown in FIG. 6 and in FIG. 5, depending upon whether the second array 50 flashes on or off. Since, the left and right tail lamps 34, 36 are substantially identically, the same illumination pattern occurs in the left lamp 34, in response to the left turn signal switch 30, as has been described for the right lamp 36.

Figure 7:
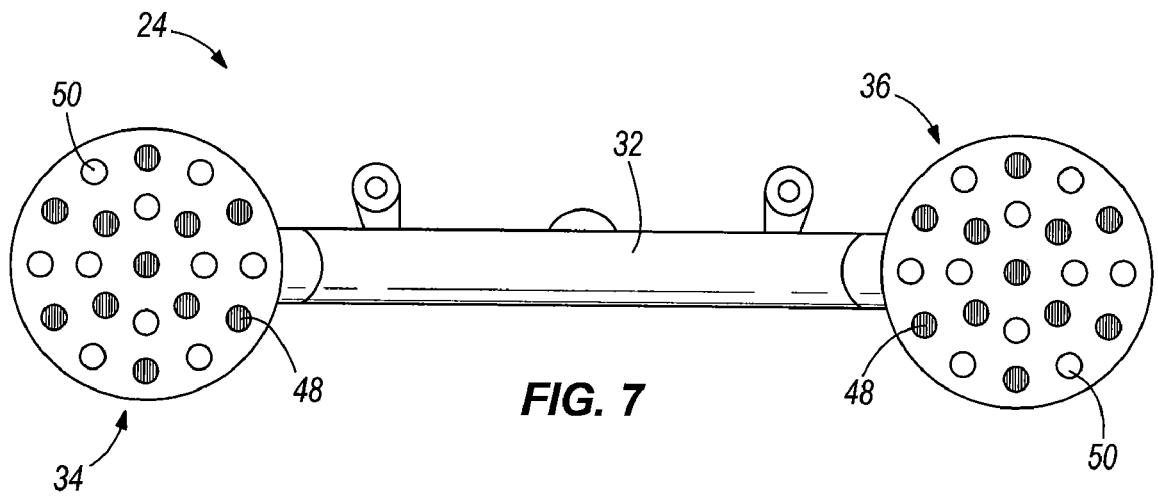
FIG. 7 is a view similar to FIG. 4, illustrating the first array in a braking condition and the second array in the non-illuminated condition.
Figure 8:
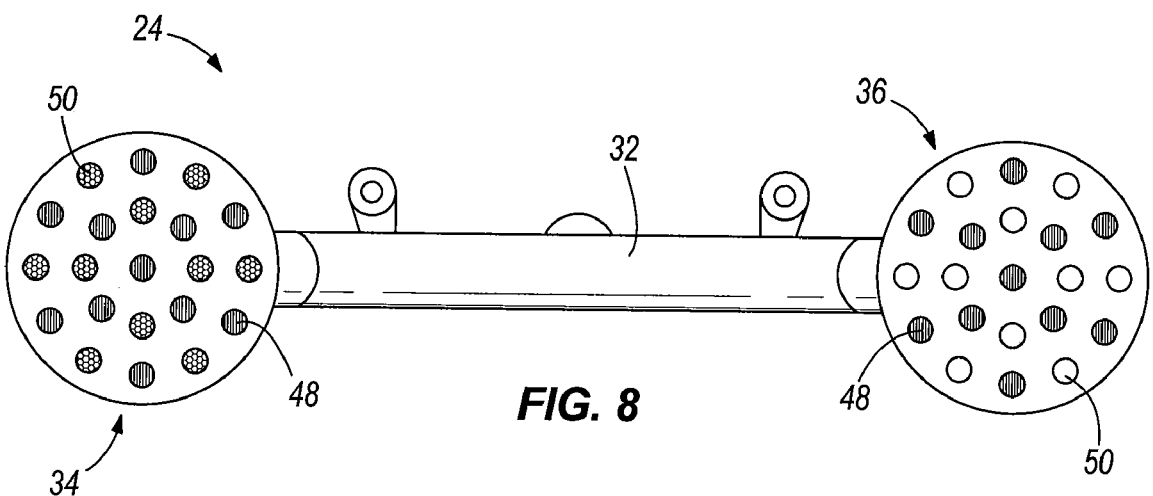
FIG. 8 is a view similar to FIG. 4, illustrating the first array in the braking condition and the second array of a left tail lamp in the flashing condition.

When either or both of the brake lever 26 and the brake pedal 28 are actuated, the first arrays 48 of both lamps 34, 36 are illuminated at a second, brighter intensity, as shown in FIG. 7. The first arrays 48 of both lamps 34, 36 remain illuminated at the brighter intensity as long as at least one of the brake lever 26 and the brake pedal 28 is actuated. When, for example, the left turn signal switch 30 is actuated while at least one of the brake lever 26 and the brake pedal 28 is actuated, the second array 50 in the left lamp 34 will alternate between being illuminated (see FIG. 8) and not illuminated (see FIG. 7). The first arrays 48 of both lamps 34, 36 remain at the second, brighter intensity as long as at least one of the brake lever 26 and the brake pedal 28 is actuated, regardless of the state of the second array 50. If the braking signal is discontinued while one of the second arrays 50 of the lamps 34, 36 is in the flashing condition, then the first arrays 48 of lamps 34, 36 will illuminate in the low intensity as described with reference to FIG. 6.

A summary of the light operations in response to the ignition signal, the brake signal, and the turn signal is included in Table 1 below.

TABLE 1

| Condition | Left Lamp | | Right Lamp | |
| --- | --- | --- | --- | --- |
| | First Array | Second Array | First Array | Second Array |
| Vehicle Off | off | off | off | off |
| Vehicle On | low | off | low | off |
| Right Turn | low | off | low | flash on |
| Right Turn | low | off | low | flash off |
| Left Turn | low | flash on | low | off |
| Left Turn | low | flash off | low | off |
| Brake | high | off | high | off |
| Brake and Right Turn | high | off | high | flash on |
| Brake and Right Turn | high | off | high | flash off |
| Brake and Left Turn | high | flash on | high | off |
| Brake and Left Turn | high | flash off | high | off |

In other embodiments, the first array 48 of the lamp 34, 36 in the turn direction could alternate between; (i) the lower intensity when the second array 50 of the lamp 34, 36 in the turn direction is illuminated during the flashing condition; and (ii) the higher intensity when the second array 50 of the lamps 34, 36 in the turn direction is not illuminated during the flashing condition even though the brake signal is continuous throughout the flashing condition. In other words, when the brake is applied, the first array 48 in the turn direction can illuminate at the high intensity when the second array 50 in the turn direction flashes off and could illuminate at the lower intensity when the second array 50 in the turn direction flashes on.

Figure 9:
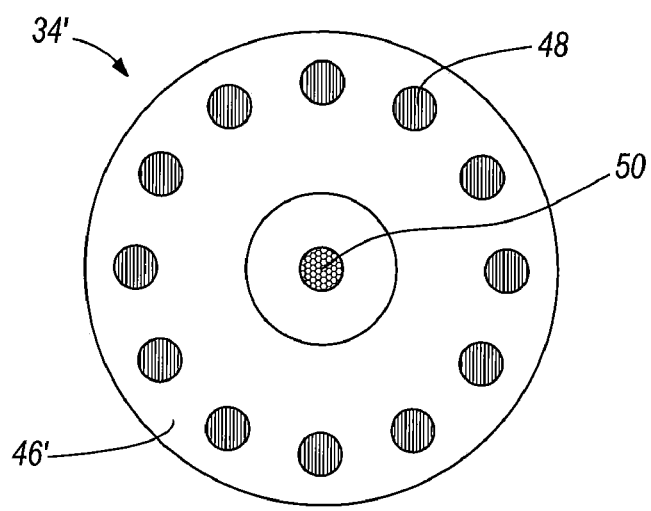
FIG. 9 is a front view of an alternate construction of the tail lamp of FIG. 3.

FIG. 9 shows an alternate arrangement of the first array 48' and the second array 50' on a different board 46'. In the illustrated embodiment, the second array 50' includes a single diode positioned generally in the center of the tail lamp 34'. The first array 48' of diodes forms a group that encircles the second array 50'. In other embodiments, the second array 50' includes two or three diodes that are positioned generally in the center of the lamp. In still other embodiments, the second array 50' includes four or more diodes, which are positioned generally in the center of the lamp 34' and are encircled by the first array 48'. The first array 48' and second array 50' of the embodiment shown in FIG. 9 operate similarly to the first and second arrays, 48, 50 of the embodiment shown in FIGS. 1-8.

Various features and advantages of the invention are set forth in the following claims.

What is claimed is:

1. A tail light assembly for a motorcycle, the tail light assembly comprising:
  left and right lamps, coupled to the motorcycle, each lamp including both
    a first array of at least one light-emitting diode coupled to the tail light housing, the first array operable to illuminate in at least a first color, the first array operable in a non-operating condition where each light-emitting diode of the first array is not illuminated, a running condition where each light-emitting diode of the first array is illuminated at first intensity, and a braking condition where each light-emitting diode is illuminated at a second intensity greater than the first intensity; and a second array of at least one light-emitting diode coupled to the tail light housing, the second array operable to illuminate in at least a second color, the second array operable in a non-operating condition where each light-emitting diode of the second array is not illuminated and a flashing condition where each light-emitting diode of the second array alternates between being illuminated and not illuminated, wherein each light-emitting diode of the first array of one of the left and right lamps is illuminated at one of the first intensity and the second intensity while each light-emitting diode of the second array of the one of the left and right lamps alternates between being illuminated and not illuminated in the flashing condition.

2. The tail light assembly of claim 1, wherein the first color is red.

3. The tail light assembly of claim 1, wherein the second color is amber.

4. The tail light assembly of claim 1, wherein the first and second arrays are intermixed.

5. The tail light assembly of claim 1, wherein the first array and second array are substantially evenly distributed on both the left and right lamps.

6. The tail light assembly of claim 5, wherein the number of light-emitting diodes in the first array is approximately equal to the number of light-emitting diodes in the second array.

7. The tail light assembly of claim 1, wherein the first array encircles the second array.

8. The tail light assembly of claim 7, wherein the second array includes fewer than five light-emitting diodes.

9. The tail light assembly of claim 7, wherein the second array includes a single light-emitting diode.

10. The tail light assembly of claim 1, wherein each light-emitting diode of the first array of the one of the left and right lamps is illuminated at the first intensity in the running condition while each light-emitting diode of the second array of the one of the left and right lamps alternates between being illuminated and not illuminated in the flashing condition, and wherein each light-emitting diode of the first array of the one of the left and right lamps is illuminated at the second intensity in the braking condition while each light-emitting diode of the second array of the one of the left and right lamps alternates between being illuminated and not illuminated in the flashing condition.

11. A motorcycle comprising:
a frame;
a brake actuator coupled to the frame and operable to generate a brake signal;
a turn signal switch coupled to the frame and operable to generate a turn signal;
an ignition switch coupled to the frame and operable to generate an ignition signal;
a tail light assembly coupled to a rear portion of the frame, the tail light assembly comprising:
first and second lamps configured to be coupled to the motorcycle, each lamp comprising:
a first array of at least one light-emitting diode coupled to the tail light housing, the first array operable in a non-operating condition where each light-emitting diode of the first array is not illuminated, a running condition in response to the ignition signal where each light-emitting diode of the first array is illuminated at first intensity, and a braking condition in response to the brake signal where each light-emitting diode is illuminated at a second intensity greater than the first intensity; and a second array of at least one light-emitting diode coupled to the tail light housing, the second array operable in a non-operating condition where each light-emitting diode of the second array is not illuminated and a flashing condition in response to the turn signal where each light-emitting diode of the second array alternates between being illuminated and not illuminated, wherein each light-emitting diode of the first array of one of the first and second lamps is illuminated at one of the first intensity and the second intensity while each light-emitting diode of the second array of the one of the first and second lamps alternates between being illuminated and not illuminated in the flashing condition and wherein the first array is operable to illuminate in at least a first color, and the second array is operable to illuminate in at least a second color.

12. The motorcycle of claim 11, wherein the first color is red.

13. The motorcycle of claim 11, wherein the second color is amber.

14. The motorcycle of claim 11, wherein the first array encircles the second array.

15. The motorcycle of claim 14, wherein the second array includes fewer than five light-emitting diodes.

16. The motorcycle of claim 14, wherein the second array includes a single light-emitting diode.

17. The motorcycle of claim 11, further comprising a plate, such that the light-emitting diodes are arranged on the plate so that the first array and the second array are intermixed over an entire surface of the plate.

18. The tail light assembly of claim 11, wherein each light-emitting diode of the first array of the one of the first and second lamps is illuminated at the first intensity in the running condition while each light-emitting diode of the second array of the one of the first and second lamps alternates between being illuminated and not illuminated in the flashing condition, and wherein each light-emitting diode of the first array of the one of the first and second lamps is illuminated at the second intensity in the braking condition while each light-emitting diode of the second array of the one of the first and second lamps alternates between being illuminated and not illuminated in the flashing condition.

19. A method of illuminating a tail light assembly on a vehicle, the method comprising:
providing a left lamp and a right lamp;
illuminating a first array of at least one light-emitting diode of one of the left and right lamps at a first intensity in a running condition;
alternating a second array of at least one light-emitting diode of the one of the left and right lamps between being illuminated and not illuminated in a flashing condition;
illuminating the first array of at least one light-emitting diode of the one of the left and right lamps at a second intensity greater than the first intensity in a braking condition; and
illuminating the first array of at least one light-emitting diode of the one of the left and right lamps at one of the first intensity and the second intensity while the second array of at least one light-emitting diode of the one of the left and right lamps alternates between being illuminated and not illuminated in the flashing condition.

20. The method of claim 19, further comprising illuminating the first array of at least one light-emitting diode of the one of the left and right lamps at the first intensity in the running condition while the second array of at least one light-emitting diode of the one of the left and right lamps alternates between being illuminated and not illuminated in the flashing condition, and illuminating the first array of at least one light-emitting diode of the one of the left and right lamps at the second intensity in the braking condition while the second array of at least one light-emitting diode of the one of the left and right lamps alternates between being illuminated and not illuminated in the flashing condition.

21. The method of claim 19, further comprising intermixing the first array of light-emitting diodes of the one of the left and right lamps and the second array of light-emitting diodes of the one of the left and right lamps.

22. The method of claim 19, further comprising encircling the at least one light-emitting diode of the first array of the one of the left and right lamps with a plurality of light-emitting diodes of the second array of the one of the left and right lamps.

* * * * *